Sept. 16, 1952   L. A. POWELL   2,610,378
COWL FASTENER
Original Filed Sept. 28, 1942

Inventor:
Leonard A. Powell.
By Philip E. Parker
Atty.

Patented Sept. 16, 1952

2,610,378

UNITED STATES PATENT OFFICE 2,610,378

COWL FASTENER

Leonard A. Powell, Hyde Park, Mass., assignor to United-Carr Fastener Corporation, Cambridge, Mass., a corporation of Massachusetts Original application September 28, 1942, Serial No. 459,896, now Patent No. 2,479,402, dated August 16, 1949. Divided and this application April 30, 1949, Serial No. 90,587

1 Claim. (Cl. 24—221)

The present invention relates to rotary stud fasteners of the type commonly used for connecting airplane cowling sheets together and aims generally to simplify and improve existing fasteners of that type.

The present application is a division of my parent application Serial No. 459,896, filed September 28, 1942, now Patent No. 2,479,402, issued August 16, 1949.

Illustrative of the invention, reference is made to the accompanying drawings showing several preferred embodiments thereof, and in which.

Figure 1:
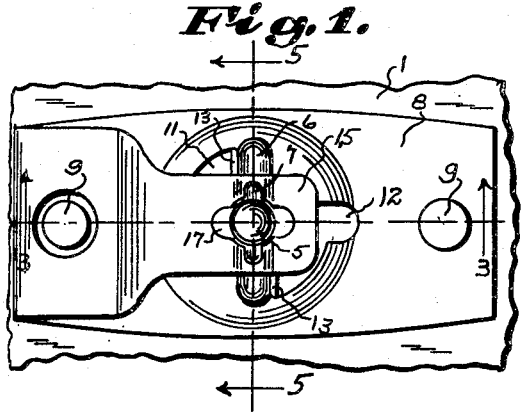
Fig. 1 is a plan view of one form of fastener secured installation as viewed from the female fastener side.
Figure 2:
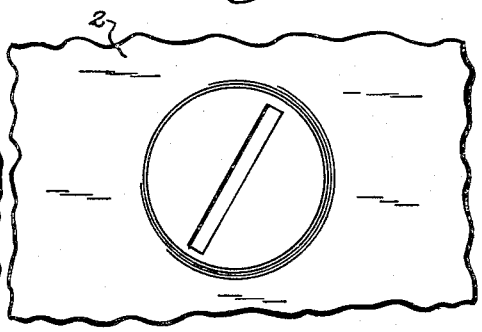
Fig. 2 is a plan view thereof as viewed from the opposite or stud fastener side.
Figure 3:
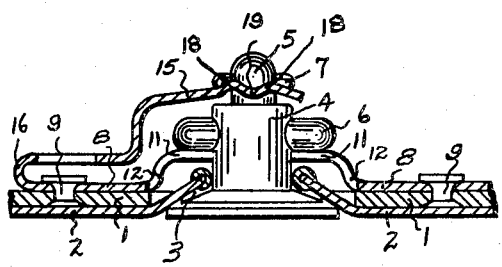
Fig. 3 is a longitudinal sectional view of the first form of fastener as taken on the line 3—3 of Fig. 1, but showing the stud fully inserted prior to being turned to locked position.

The present invention provides new and efficient female fastening members for cooperation with rotary stud fasteners having a plurality of sets of radial arms or pins at least one of which is designed to lock against a locking plate of the female fastening member. According to the invention, means are provided for engaging one set of radial stud arms for resiliently holding the parts of the installation in flush-tight locked position. In accordance with one embodiment, the invention includes means for automatically partially ejecting the stud from the female fastener member when in unlocked position so that the unlocked condition of the fastener will readily be apparent to a workman or inspector.

Referring more particularly to the form of invention shown in Figs. 1 to 6 inclusive, the improved fastener member is shown applied to a suitable support 1, which may be one of the cowling sheets of an airplane cowling, though it will be understood that the invention is not restricted to such use. The cooperating sheet 2, which is to be secured to the sheet 1 in flush-tight relationship, conveniently is apertured, as at 3, in which is fitted a rotary stud or pin 4 having a head 5 exteriorly of the sheet 2. Conveniently the sheet 2 is countersunk around the aperture 3 and the head 5 of the stud 4 is bevelled so that in locked position the outer face of the head will be flush with the outer face of the sheet 2. The head of the stud may be slotted or grooved for the reception of a bladed tool for rotating the stud, as is usual.

In order to fasten the sheets 1 and 2 securely together, the rotary stud or pin is adapted to cooperate and lock with a female fastener member attached to the rear face of the support or sheet 1, and preferably the female fastener is formed of an elongated strip of metal having a base portion 8 rigidly attached to the sheet 1, as by rivets 9. The central portion of the base is raised or spaced from the sheet 1 (see Figs. 3 to 7) to provide a pin arm-receiving seat 10 which preferably is a rigid part or deformation. The raised portion of the base is provided with a central stud-receiving aperture 11, in registry with the aperture of the sheet 1, and said aperture 11 is preferably formed with radial elongations 12 to admit the passage of radial pin arms 6 and 7. The seat 10 preferably is further formed with stop means 13 spaced a desired distance from the elongations 12, as for example 90° therefrom, and advantageously these stop means are formed by outwardly bending portions cut from the raised portion, and serving to provide an abutment to limit rotation of the stud to a desired angular position.

The female fastener member preferably includes an integral spring arm 15 extended from one end of the base and connected thereto by a U-shaped bight portion 16 so as to overlie a portion of the base and the stud when the parts of the fastener are assembled. The portion of the spring arm 15, preferably an end portion thereof, is outwardly inclined and formed with an elongated opening 17 to receive the end of the stud 4 and radial pin arms 7, and this opening 17 is preferably in alignment with the aperture 10 and radial elongations 12 of the raised seat portion 10 of the base. The end of the spring, on opposite sides of the opening 17, is formed with spaced raised portions 18 and an intermediate pin-receiving seat 19 for the reception of the radial pin arms 7 when the stud is rotated to locked position.

Figure 4:
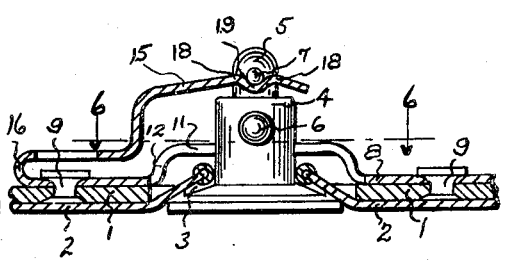
Fig. 4 is a similar view with the stud in its locked position.
Figure 5:
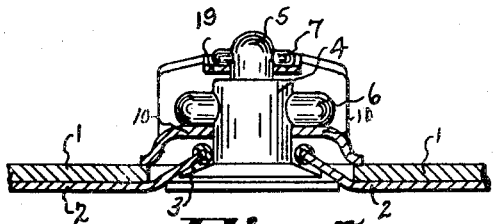
Fig. 5 is a transverse sectional view taken on the line 5—5 of Fig. 1.
Figure 6:
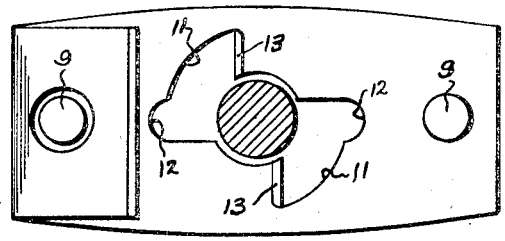
Fig. 6 is a horizontal sectional view taken on the line 6—6 of Fig. 4.

When the stud 4 is applied to the female fastener member and rotated to locked position, as shown in Fig. 4, the interengaging spring arm and stud pin arms 7 provide supplemental resilient tension for holding the parts in assembled locked position as well as to provide a yieldable seat for the supplemental pin arms 7 tending to resist accidental rotation or unlocking of the stud, such as may be caused by vibration of the parts 1 and 2.

It will be understood that the base portion 8 of the female fastener may be attached to the support 1 in any suitable manner, and when it is desirable to rivet the base to the support in regions underlying an overlying spring arm, the spring arm may be apertured as at 19a for the passage of the rivet and riveting tool.

Figure 7:
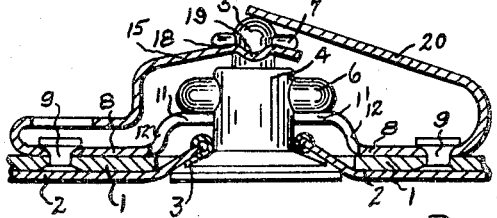
Fig. 7 is a sectional view similar to Fig. 3 of a slightly modified form of the invention.

According to one feature of the invention, it is desirable to provide means for automatically partially ejecting the stud when in unlocked position, so that the condition of the fastener will be readily apparent to the workman or inspector, merely by observation. This may be accomplished by providing a spring arm extension 20 connected to and extending from the base 8 and overlying the stud-receiving apertures outwardly of the base, as shown in Fig. 7. When the stud 4 is in locked position in the fastener as shown in Fig. 7, the spring arm 20 is under tension. When the stud is in unlocked position with the pin arms 6 and 7 aligned with the elongations of the openings 11 and 17 respectively, the spring 20 forces the stud inwardly, partially ejecting the stud, so that the head 5 is forced out of the countersunk recess in the sheet 2, thus providing an effective visual indication that the fastener is unlocked.

Although I have illustrated and described preferred embodiments of my invention, I do not wish to be limited thereby because the scope of my invention is best defined by the following claim.

I claim:

In a cowl fastener a female fastening element adapted to be secured to one side of an apertured support and adapted to receive and cooperate with a rotary pin equipped with a plurality of sets of radial arms and mounted in a member to be fastened to said support, said female fastening member comprising a metal strip having an apertured base attached to said support with the aperture thereof in alignment with the support aperture, a portion of said base being spaced from the adjacent face of the support providing an outwardly spaced seat for cooperative engagement with one pair of radial arms, and a spring member integrally connected to one end of said base and folded back thereover and formed with an apertured pin-receiving seat portion for receiving and engaging another set of radial arms of said pin for supplying supplemental resilient pressure for holding said pin in said female fastener element.

LEONARD A. POWELL

REFERENCES CITED

The following references are of record in the file of this patent:

UNITED STATES PATENTS

| Number | Name | Date |
|---|---|---|
| 2,307,004 | Murphy | Dec. 29, 1942 |
| 2,324,269 | Poupitch | July 13, 1943 |
| 2,327,327 | Maynard | Aug. 17, 1943 |
| 2,440,790 | Venditty | May 4, 1948 |